US010945016B2

(12) United States Patent
Downing et al.

(10) Patent No.: US 10,945,016 B2
(45) Date of Patent: Mar. 9, 2021

(54) APPARATUS AND METHOD FOR GATHERING ANALYTICS

(71) Applicant: AiBUY, Inc., Dallas, TX (US)

(72) Inventors: Todd Downing, Irving, TX (US); Christian Briggs, Austin, TX (US); Robert K. Spitz, Amherst, NH (US); David M. Burrows, Dallas, TX (US); James Kersbergen, Irving, TX (US); Ryan Scott, Waxahachie, TX (US); Ken Kopilevich, Novato, CA (US); Robert Eugene Smith, Austin, TX (US); Serge Kononov, Austin, TX (US)

(73) Assignee: AiBUY, Inc., Dallas, TX (US)

( * ) Notice: Subject to any disclaimer, the term of this patent is extended or adjusted under 35 U.S.C. 154(b) by 0 days.

(21) Appl. No.: 14/633,986

(22) Filed: Feb. 27, 2015

(65) Prior Publication Data

US 2015/0245084 A1    Aug. 27, 2015

Related U.S. Application Data

(60) Provisional application No. 61/945,646, filed on Feb. 27, 2014, provisional application No. 61/953,607, filed on Mar. 14, 2014.

(51) Int. Cl.
*H04N 21/472* (2011.01)
*H04N 21/2668* (2011.01)
(Continued)

(52) U.S. Cl.
CPC ......... *H04N 21/2668* (2013.01); *G06F 16/24* (2019.01); *G06F 16/2457* (2019.01);
(Continued)

(58) Field of Classification Search
USPC .............................................. 725/10, 12, 14
See application file for complete search history.

(56) References Cited

U.S. PATENT DOCUMENTS 5,206,934 A    4/1993  Naef, III
6,446,261 B1   9/2002  Rosser
(Continued)

FOREIGN PATENT DOCUMENTS

CN        102483826 A     5/2012
WO    WO 2011/149491    12/2011
(Continued)

OTHER PUBLICATIONS

International Search Report and Written Opinion for International Application No. PCT/US2015/018140, dated Jun. 3, 2015, 9 pages.
(Continued)

*Primary Examiner* — Mulugeta Mengesha
*Assistant Examiner* — Charles N Hicks
(74) *Attorney, Agent, or Firm* — Cooley LLP

(57) ABSTRACT

A method and apparatus are provided for gathering analytics. In an embodiment, a method includes monitoring interactions of multiple users related to at least one of: multiple base content and multiple supplemental content. The supplemental content is associated with one or more products or services identified in the base content. The method also includes obtaining interaction information associated with the interactions. The method also includes selecting specified supplemental content to present to a specified user based on (i) the interaction information and (ii) specified base content presented to the specified user. The method also includes sending the specified base content and the specified supplemental content to an endpoint associated with the specified user.

22 Claims, 13 Drawing Sheets

(51) Int. Cl.

| | | |
|---|---|---|
| *H04N 21/81* | (2011.01) | |
| *H04N 21/442* | (2011.01) | |
| *H04N 21/45* | (2011.01) | |
| *H04N 21/466* | (2011.01) | |
| *H04N 21/258* | (2011.01) | |
| *G06Q 30/02* | (2012.01) | |
| *G06F 16/2458* | (2019.01) | |
| *G06F 16/24* | (2019.01) | |
| *G06F 16/2457* | (2019.01) | |
| *H04N 21/234* | (2011.01) | |
| *H04N 21/44* | (2011.01) | |

(52) U.S. Cl.
CPC ..... *G06F 16/2465* (2019.01); *G06Q 30/0255* (2013.01); *G06Q 30/0261* (2013.01); *G06Q 30/0269* (2013.01); *H04N 21/25883* (2013.01); *H04N 21/25891* (2013.01); *H04N 21/44204* (2013.01); *H04N 21/44222* (2013.01); *H04N 21/4532* (2013.01); *H04N 21/4667* (2013.01); *H04N 21/812* (2013.01); *H04N 21/23418* (2013.01); *H04N 21/44008* (2013.01); *H04N 21/44218* (2013.01)

(56) References Cited

U.S. PATENT DOCUMENTS

| | | | |
|---|---|---|---|
| 6,608,636 | B1 | 8/2003 | Roseman |
| 6,789,120 | B1 | 9/2004 | Lee et al. |
| 7,730,132 | B2 | 6/2010 | Ludwig et al. |
| 8,150,464 | B2 | 4/2012 | Dey |
| 8,387,087 | B2 | 2/2013 | Girouard et al. |
| 8,423,467 | B1 | 4/2013 | Johansson et al. |
| 8,910,201 | B1 | 12/2014 | Zamiska et al. |
| 9,047,632 | B2 | 6/2015 | McCarthy, III |
| 9,703,463 | B2 | 7/2017 | Avedissian et al. |
| RE46,865 | E | 5/2018 | Schifone |
| 10,728,603 | B2 | 7/2020 | Spitz et al. |
| 2002/0056109 | A1 | 5/2002 | Tomsen |
| 2003/0040962 | A1* | 2/2003 | Lewis ............... G06Q 30/0225 725/32 |
| 2003/0055723 | A1 | 3/2003 | English |
| 2004/0139156 | A1 | 7/2004 | Matthews et al. |
| 2004/0153385 | A1* | 8/2004 | Allibhoy ............. G06Q 20/027 705/35 |
| 2004/0244029 | A1* | 12/2004 | Gross ................ G06Q 30/02 725/9 |
| 2005/0229227 | A1 | 10/2005 | Rogers |
| 2005/0235033 | A1 | 10/2005 | Doherty |
| 2006/0132607 | A1 | 6/2006 | Kimber et al. |
| 2006/0256133 | A1 | 11/2006 | Rosenberg |
| 2007/0150370 | A1 | 6/2007 | Staib et al. |
| 2007/0260520 | A1 | 11/2007 | Jha et al. |
| 2008/0097843 | A1 | 4/2008 | Menon et al. |
| 2008/0162343 | A1 | 7/2008 | Bedier |
| 2010/0017299 | A1 | 1/2010 | Pirani |
| 2010/0077428 | A1* | 3/2010 | Arnold ............... H04N 7/17318 725/34 |
| 2010/0082441 | A1 | 4/2010 | Doemling et al. |
| 2010/0153831 | A1 | 6/2010 | Beaton |
| 2010/0332329 | A1 | 12/2010 | Roberts et al. |
| 2011/0071865 | A1 | 3/2011 | Leeds et al. |
| 2012/0079021 | A1 | 3/2012 | Roman et al. |
| 2013/0014155 | A1* | 1/2013 | Clarke ............... G11B 27/105 725/32 |
| 2013/0031582 | A1* | 1/2013 | Tinsman ............. H04N 21/2353 725/36 |
| 2013/0054757 | A1 | 2/2013 | Spitz et al. |
| 2013/0151340 | A1 | 6/2013 | Barbieri et al. |
| 2013/0211891 | A1 | 8/2013 | Daniel et al. |
| 2013/0254018 | A1 | 9/2013 | Rao |
| 2014/0007155 | A1 | 1/2014 | Vemparala et al. |
| 2014/0019860 | A1 | 1/2014 | Sathish et al. |
| 2015/0189355 | A1* | 7/2015 | Korbecki ........... H04N 21/4117 725/12 |
| 2015/0264417 | A1 | 9/2015 | Spitz et al. |
| 2016/0012398 | A1 | 1/2016 | Dantu et al. |
| 2017/0301003 | A1 | 10/2017 | Spitz et al. |

FOREIGN PATENT DOCUMENTS

| | | |
|---|---|---|
| WO | WO 2015/131126 | 9/2015 |
| WO | WO 2015/138612 | 9/2015 |
| WO | WO 2016/109810 | 7/2016 |

OTHER PUBLICATIONS

Office Action for U.S. Appl. No. 14/644,603, dated Dec. 4, 2015, 7 pages.

Office Action for U.S. Appl. No. 14/644,603, dated Apr. 15, 2016, 8 pages.

International Search Report and Written Opinion for International Application No. PCT/US2015/019979, dated Jul. 30, 2015, 10 pages.

International Search Report and Written Opinion for International Application No. PCT/US2015/068311, dated Apr. 14, 2016, 8 pages.

Kappe, F. M., "Aspects of a Modern Multi-Media Information System," Dissertation for the Award of the Academic Degree Doctor of Technical Sciences at the Graz University of Technology, Institute for Foundations of Information Processing and Computer Supported Media (IICM), Graz University of Technology, Jun. 1991, 164 pages.

Jeffay, K. et al., "System Design for Workstation-Based Conferencing with Digital Audio and Video," Proceedings of TRI COMM '91, IEEE Conference on Communications Software: Communications for Distributed Application and Systems, Chapel Hill, North Carolina, Apr. 18-19, 1991, pp. 169-177.

Reid, F. et al., "An Analysis of Anonymity in the Bitcoin System," Cha. 1 (online), <URL: https://arxiv.org/pdf/1107.4524.pdf>, May 7, 2012, 29 pages.

Supplementary Partial European Search Report for European Application No. 15760646.8, dated Jul. 21, 2017, 7 pages.

Office Action for U.S. Appl. No. 14/966,780, dated Mar. 9, 2017, 29 pages.

Extended European Search Report for European Application No. 15760646.8, dated Oct. 24, 2017, 11 pages.

Office Action for U.S. Appl. No. 14/644,603, dated Jan. 31, 2017, 16 pages.

Office Action for U.S. Appl. No. 14/644,603, dated Nov. 2, 2017, 11 pages.

First Office Action for Chinese Application No. 201580013586.8, dated Feb. 2, 2019, 28 pages.

Second Office Action for Chinese Application No. 201580013586.8, dated Sep. 20, 2019, 36 pages.

Rejection Decision for Chinese Application No. 201580013586.8, dated Mar. 27, 2020, 56 pages.

Office Action for U.S. Appl. No. 14/644,603, dated Jan. 2, 2019, 13 pages.

Office Action for U.S. Appl. No. 14/644,603, dated Oct. 18, 2019, 16 pages.

Office Action for U.S. Appl. No. 15/639,786, dated Jan. 18, 2019, 9 pages.

Office Action for U.S. Appl. No. 15/639,786, dated Oct. 15, 2019, 11 pages.

Zhang, S., "GANHUI Firm E-Commerce Sites Construction," IT Book of CMFD, No. 3, 2012, pp. 1139-1539.

* cited by examiner

| Preroll 0:15 | Segment A1 | Segment B1 | Segment C1 | Postroll 0:30 |
|---|---|---|---|---|

*FIG. 6A*

| Preroll 0:30 | Segment A2 | Segment B1 | Segment C2 | Postroll 0:30 |
|---|---|---|---|---|

*FIG. 6B*

APPARATUS AND METHOD FOR GATHERING ANALYTICS

CROSS-REFERENCE TO RELATED APPLICATIONS AND PRIORITY CLAIM

This application claims priority under 35 U.S.C. § 119(e) to U.S. Provisional Patent Application No. 61/945,646 filed on Feb. 27, 2014 and U.S. Provisional Patent Application No. 61/953,607 filed on Mar. 14, 2014. The contents of the above-identified provisional patent applications are hereby incorporated by reference in their entirety.

TECHNICAL FIELD

This disclosure is generally directed to software and more specifically to a system and method for gathering analytics.

BACKGROUND

It is well-known that videos may be broadcast or provided through a number of media, such as television, the Internet, DVDs, and the like. To finance such video broadcasts, commercial advertisements are often placed in the videos. Commercials, however, require that a video be momentarily interrupted while the commercials are displayed. Not only is this annoying to viewers, but digital video recorders (DVRs) allow video programs to be pre-recorded. When the video programs are viewed, DVRs allow the viewers to fast-forward through commercials, thereby defeating the effectiveness and value of the commercials. When commercials are de-valued, costs are not adequately covered, and broadcast service quality suffers as a result. In many cases, costs are made up by charging viewers for video services.

In many conventional systems, a variety of different content has little or no interactivity. This includes both videos and images. For example, when viewing video, different objects in the video are often merely part of a single video stream that is inseparable with respect to the different objects. Static advertisements near the video stream related to the video are not very compelling as they are separated from the video in such a way that a user is not encouraged to interact with the static advertisement.

SUMMARY

This disclosure provides an apparatus and method for gathering analytics.

In a first embodiment, a method includes monitoring interactions of multiple users related to at least one of: multiple base content and multiple supplemental content. The supplemental content is associated with one or more products or services identified in the base content. The method also includes obtaining interaction information associated with the interactions. The method also includes selecting specified supplemental content to present to a specified user based on (i) the interaction information and (ii) specified base content presented to the specified user. The method also includes sending the specified base content and the specified supplemental content to an endpoint associated with the specified user.

In a second embodiment, a method includes monitoring one or more social networks for one or more trending topics. The method also includes selecting supplemental content to be presented in association with base content. The supplemental content is selected based on (i) the one or more trending topics and (ii) the base content, the supplemental content associated with one or more products or services identified in the base content. The method also includes sending the selected supplemental content to an endpoint associated with a user.

In a third embodiment, a method includes monitoring for multiple predefined events. The method also includes, responsive to a user triggering one of the predefined events, determining whether the user is associated with a hot wallet. The method also includes, responsive to the user being associated with the hot wallet, mining crypto-currency in the hot wallet for currency information related to interactions of the user.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIGS. 6A and 6B illustrate an example dynamic creation of base content according to this disclosure;

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system.

Figure 1:
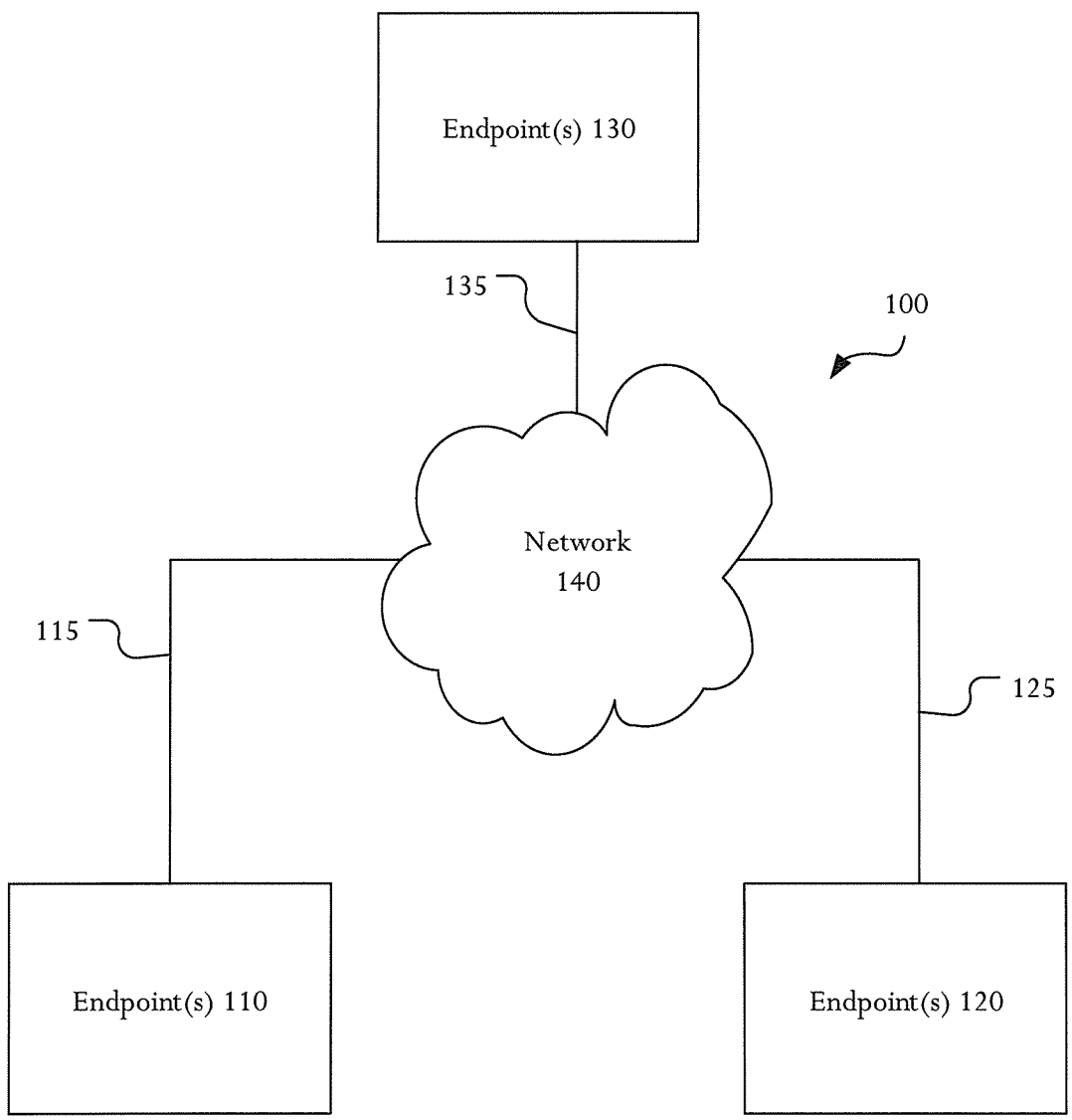
FIG. 1 illustrates an example communication system that can be utilized to facilitate communication between endpoints through a communication network according to this disclosure.

FIG. 1 illustrates an example communication system 100 that can be utilized to facilitate communication between endpoints through a communication network according to this disclosure. As shown in FIG. 1, the system 100 includes various endpoints 110, 120, and 130. In this document, the term "endpoint" generally refers to any device, system, or other structure that communicates with another endpoint. Example endpoints 110, 120, and 130 include but are not limited to servers (such as application servers and enterprise servers), desktop computers, laptop computers, netbook computers, tablet computers (such as APPLE IPADs), switches, mobile phones (such as IPHONE and ANDROID-based phones), networked glasses (such as GOOGLE GLASS), networked televisions, networked disc players, components in a cloud-computing network, or any other device or component suitable for communicating information to and from a communication network. Endpoints 110, 120, and 130 may support Internet Protocol (IP) or any other suitable communication protocol(s). Endpoints 110, 120, and 130 may additionally include medium access control (MAC) and physical layer (PHY) interfaces, such as those that conform to the IEEE 701.11 standard. An endpoint 110, 120, and 130 can have a device identifier, such as a MAC address, and may have a device profile that describes the endpoint.

A communication network 140 facilitates communications between the endpoints 110, 120, and 130. Various links 115, 125, and 135 couple the endpoints 110, 120, and 130 to the communication network 140. The communication network 140 and associated links 115, 125, and 135 may include but are not limited to a public or private data network, a telephony network, a local area network (LAN), a metropolitan area network (MAN), a wide area network (WAN), a wireline or wireless network (such as GSM, CDMA, LTE, WIMAX, 5G, or the like), a local/regional/global communication network, portions of a cloud-computing network, a communication bus for components in a system, an optical network, a satellite network, an enterprise intranet, or any other communication links or combinations of the preceding. In particular embodiments, portions of the links 115, 125, 135 or the communication network 140 may be on or form a part of the Internet.

Although the endpoints 110, 120, and 130 generally appear as being in a single location in FIG. 1, various endpoints may be geographically dispersed, such as in cloud computing scenarios. Also, each endpoint could represent a fixed or mobile device. When the endpoints 110, 120, and 130 communicate with one another, any of a variety of security schemes may be utilized. As an example, in particular embodiments, the endpoints 110 and 120 may represent clients, and the endpoint(s) 130 may represent one or more servers in a client-server architecture. The server(s) may host a website, and the website may have a registration process whereby a user establishes a username and password to authenticate or log into the website. The website may additionally utilize a web application for any particular application or feature that may need to be served up to the website for use by the user. Additionally, in particular configurations, the communication between the endpoints 110 and 120 may be facilitated using a communication path through the endpoint 130.

Various embodiments described in this patent document may benefit from and/or utilize SMART CONTAINER technology from UNSAY, INC., which is briefly described below and is described more fully in U.S. Pat. No. 8,769,053 (which is hereby incorporated by reference in its entirety). This technology provides an innovative way for merchants to reach their customers online. In the traditional online sales model, merchants need to create search or display ads that show up when online consumers visit search engine sites or various web properties. If a consumer sees an interesting ad related to a product or service, the consumer needs to leave his or her current activity and visit some other web destination to discover more information or make an online purchase. Consumers have specific online behavior patterns. If consumers are actively shopping, the traditional multistep model is workable. The traditional advertising sales model requires that a consumer stop what he or she is doing and visit some other online destination. However, if consumers are on social sites interacting with friends, reading the news, playing games, or engaging in other online activities, they are much less likely to leave their current activities to visit some external Internet destinations.

The SMART CONTAINER model brings product information or a store to the consumer. The SMART CONTAINER code/technology virally syndicates across the web, for example, using components described with reference to FIGS. 1 and 12 or using other components. It is ideal for those types of destinations that online consumers tend to frequent, such as social networks and blogs. Regardless, if the SMART CONTAINER code is located on a web page, a blog article, a social network page or wall, or a mobile device, a consumer can complete a transaction right there with no need to be diverted to some external destination.

SMART CONTAINER objects are intelligent Internet objects that virally syndicate and propagate across the web and other connected networks and mobile devices. They can be configured in a variety of ways to address the entire value chain of online marketing and shopping. This includes impressions, clicks, lead generation, and performing e-commerce transactions. A modern shopping experience works best when interactive media is used. One of the most appealing forms of media for sales and shopping is video. It allows a much more lifelike representation than text or static pictures. It also creates a much richer product browsing or shopping experience.

SMART CONTAINER code is normally configured with a video player window, a selection of products or services being offered, and a variety of related video clips. This collection of video clips allows a consumer to learn more about the products or services being offered. The consumer can select any of these offered items to get more details, all enclosed within the SMART CONTAINER technology.

The offered items (products or services) may be items being advertised or sold. Depending on the type, the SMART CONTAINER code may allow a consumer to request to be contacted, or even purchase the object, right there. The consumer need not leave his or her current activity or web page. Offered items could also include or be associated with discounts or coupons. They may even be an opportunity to donate to a charity or political campaign. Of course, sometimes it does make sense to visit another Internet designation, and if appropriate the consumer can certainly be linked there as well.

Because the SMART CONTAINER code handles all the complexity, it can turn the simplest website into an instant e-commerce store. This enables anyone to transact online without having to deal with the complexity of setting up an e-commerce site. For merchants with an e-commerce site, it readily enables a much richer shopping experience. For the creative hobbyist or local band, it lets them readily sell directly to interested consumers. To support and promote them, supplemental items in the SMART CONTAINER code called ON-DEMAND merchandise can be offered. Merchants can custom design a selection of apparel with their art and graphics to be sold along with their own creations. ON-DEMAND fulfillment dynamically produces and ships their custom apparel for them, eliminating the need to manage inventory and providing their online customers with a richer line of products. Of course, because their instant e-commerce stores are based on SMART CONTAINER objects, it can also propagate out onto all forms of viral syndication methods as well.

The SMART CONTAINER code is also auto-customizing according to particular configurations. If a device is a traditional personal computer (PC) or laptop, it will render using optimal technology, which for this purpose could represent FLASH. On mobile devices such as IPHONEs, IPADs, or ANDROID phones, this means HTML5 or a native interactive app will likely get used. The items in the SMART CONTAINER code also know about each other according to particular configurations. When a video is playing, a container can update product and service objects being shown that correspond with the particular sequence in a video segment. It allows a "mini QVC" shopping channel to be created and syndicated across the Internet. Beyond device type, there are other dimensions of customization. Smaller devices and some environments such as social sites restrict window sizes, so the SMART CONTAINER code adapts. In addition, it may be appropriate to provide different content based on geolocation, so the SMART CONTAINER code can customize for these, as well.

The SMART CONTAINER code virally syndicates across the Internet following the more popular network paths. SMART CONTAINER objects can be hosted on traditional web pages or blogs, contained in emails, operate on mobile devices, or propagate social networks. Because the SMART CONTAINER code is flexible, it can also be set up in the form factor of a display ad unit and distributed via ad servers on display advertising networks. When the code exists on social networks like FACEBOOK, it can ride the wave of user "likes." For example, if a woman shopper likes some great shoes shown in a SMART CONTAINER object interface, the SMART CONTAINER object can propagate directly to their "wall." Now all of her friends see the SMART CONTAINER object and can view or transact right there on their own walls. Of course, if any of her friends also "like" it, the SMART CONTAINER object propagates and rides the wave further out into that branch of the social network, yielding a potential exponential growth factor. The container does not necessarily involve products like shoes. As another example, a container can support a politician running for office. His or her supporters may be passionate about a message and "like" it, again making it available to their networks. Now, similarly-minded political supporters can view those messages and, if so moved, donate to the cause. Yet another example is sports. In this case, a sports fan may wish to watch content on his or her high-definition (HD) large screen television. More and more users have interconnected devices such as ROKU and CHROMECAST devices, and the SMART CONTAINER code may be sent to such IP television boxes, as well.

When merchants launch and syndicate their SMART CONTAINER objects onto the Internet, they want to know how their campaigns are performing. SMART CONTAINER objects report back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop a marketing or sales campaign.

Another form of tracking relates to how the SMART CONTAINER code is propagated. A merchant may wish to use affiliates to help syndicate them and pay them a percentage based on the transactions resulting from their work. SMART CONTAINER objects can be tagged with affiliate tracking identifiers, allowing status reports and transactions from container instances or their descendants to be properly filtered. Another tracking usage may be for a politician to assign affiliate codes to his or her supporters and be able to measure whose efforts result in the most new supporters.

SMART CONTAINER objects are designed to be highly scalable according to particular configurations. Rather than burden a single website with massive traffic (which would result from a traditional model of bringing all consumers to a store), SMART CONTAINER code operates in a distributed manner. For example, the SMART CONTAINER code can execute where it is located, such as on a blog, a social network, or a mobile device. SMART CONTAINER objects fetch their instructions when started and then gather their product items and video streams from a worldwide distributed content delivery network. This results in a highly scalable architecture, allowing millions of concurrent consumers.

By bringing the store to the customer, the SMART CONTAINER code enables many new ways for merchants to connect with their consumers without disrupting the consumers' web activities. The end result is to connect the consumers directly with the merchants, eliminating the middleman and promoting a much more natural shopping experience.

Figure 12:
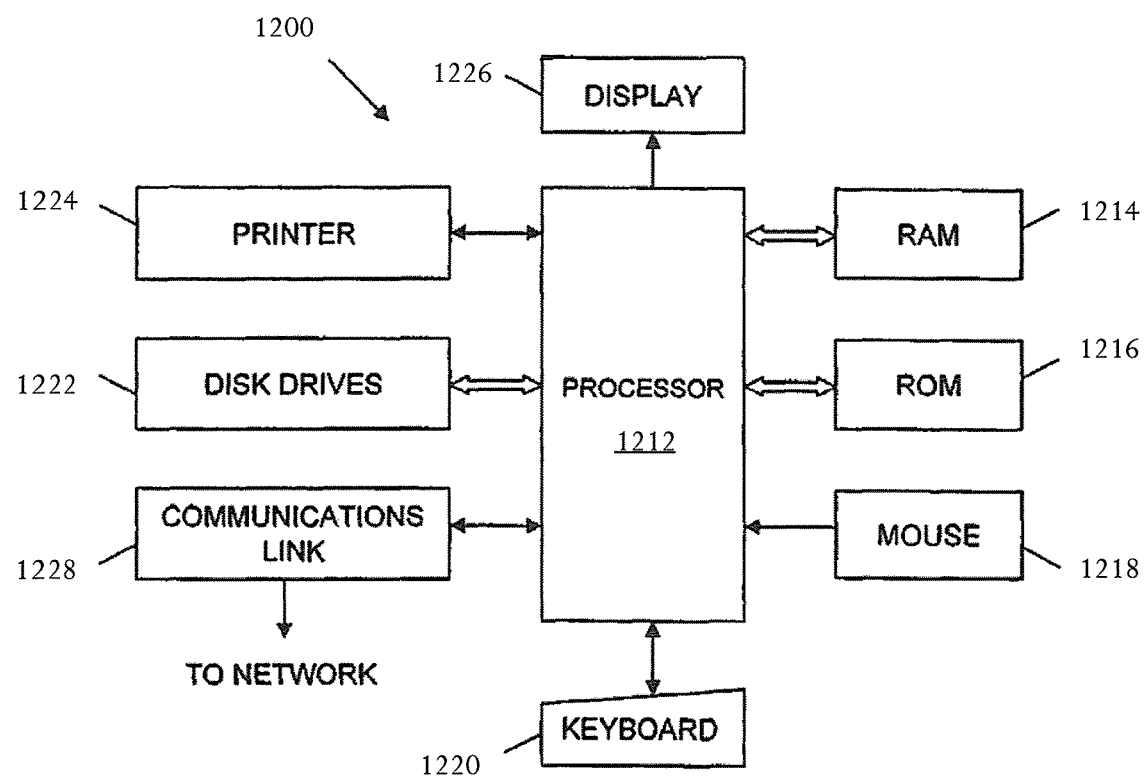
FIG. 12 illustrates an example computing device supporting various functions according to this disclosure.

The functionality of the above description may avail from any suitable components, such as those described in FIGS. 1 and 12 or other suitable components. The code itself may be written in any suitable format, including but not limited to JAVA, C++, C-sharp, HTML, HTML5, JAVA SCRIPT, PYTHON, RUBY, and the like.

There exists a variety of content in the world that is independent, existing separate from any special containers such as that invoked by the SMART CONTAINER code. Certain embodiments of this disclosure seek to harness the power of such content by dynamically binding supplemental content to underlying base content. As a simple example, a video may be streamed from a content server such as provided by one of many video streaming services. The base content represents any type of visual or audio content, be it a picture, a streaming video, a live stream from a remote location, real-time content from the current location of a device, a web page, or other types of visual content. The supplemental content represents additional information related to the base content and/or a user accessing the base content. Supplemental content can include products or services, information about the products or services, and the like.

FIGS. 2A through 2E illustrate an example dynamic binding of supplemental content to base content according to this disclosure. As seen in FIGS. 2A through 2E, a base content 200 is generally shown. The base content 200 could represent any of the types of visual or audio content described above. The supplemental content represents additional information related to the base content and/or a user accessing the base content. In some embodiments, the supplemental content can override the module playing the base content and expand the functionality of the module (such as with YOUTUBE).

In particular embodiments, the supplemental content may include additional information, configurable controls, selectable configurations, content transactional items such as products or services, and the like. Content transactional items can be referred to as supplemental transactional items or supplemental transaction items and can be part of supplemental content. Although the displayable area for the base content 200 is generally shown as having a rectangular boundary area, the displayable area for the base content 200 may take on other shapes. Additionally, the base content 200 may be shown in (or through) a virtually limitless number of devices, from mobile phones to computers to televisions.

As examples of the above, the base content 200 may be a video streamed through a video-based provider, such as YOUTUBE, VIMEO, NETFLIX, REDBOX INSTANT or others, being viewed on a computer, a mobile device, a television screen, or any other suitable device or devices. The base content 200 may also be a real-time view of content at a current location being viewed through an electronic device such as GOOGLE GLASS or a real-time view in a mobile computing device such as a tablet or phone. In yet other configurations, the base content 200 may be an image. In still other configurations, the base content 200 may be a web page.

Figure 2A:
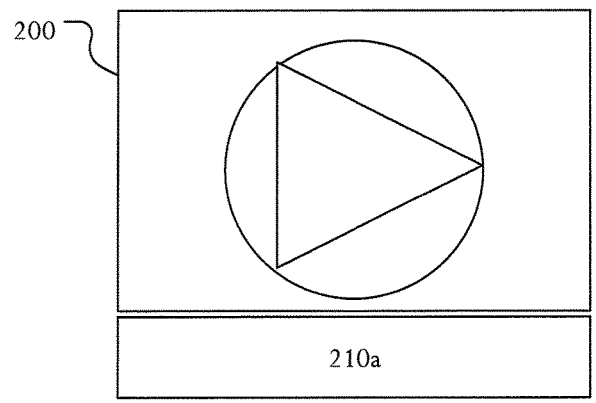
FIGS. 2A through 2E illustrate an example dynamic binding of supplemental content to base content according to this disclosure.
Figure 2B:
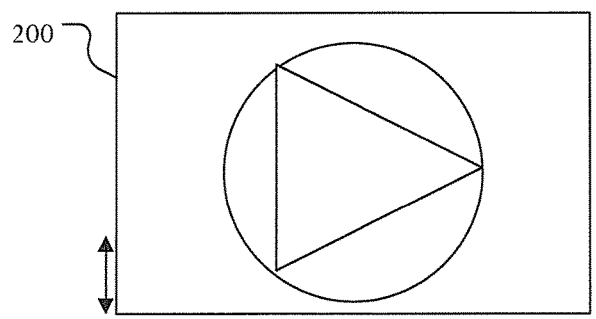
Figure 2C:
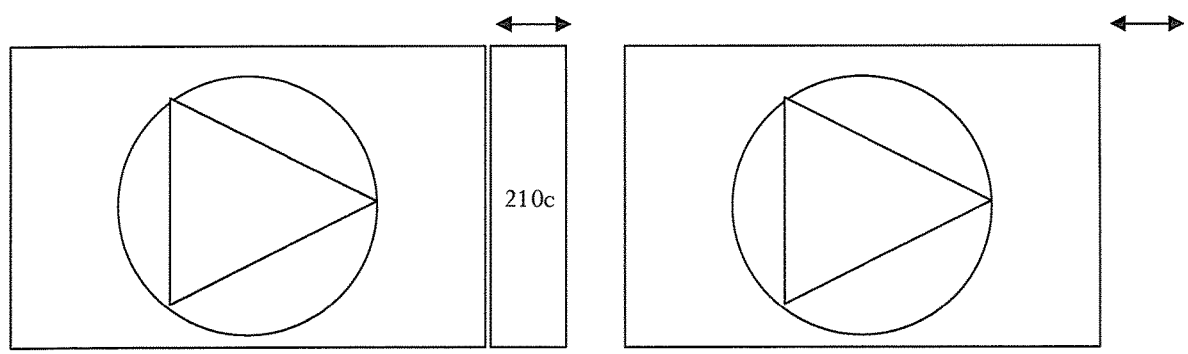

Also shown in FIGS. 2A through 2E are non-limiting examples of supplemental content 210a-210e that are configured to dynamically bind to the base content 200. Although certain examples are provided, it should be understood that such examples are non-limiting and other configurations may be utilized as will become apparent to one of ordinary skill in the art having read this disclosure. In some configurations, the supplemental content may overlay the base content, whether partially transparent or not. Examples of supplemental content 210b and 210e overlaying the base content 200 are shown in FIG. 2B (left position) and FIG. 2E. In other configurations, the supplemental content may be positioned outside of the base content 200, such as to the left, right, top, bottom, or other positions. Examples of supplemental content 210a, 210c, and 210d outside of a boundary area of the base content 200 are shown in FIG. 2A, FIG. 2C (left position), and FIG. 2D.

In certain configurations, the supplemental content may be selectively displayable and/or selectively "hideable," such as due to user action or inaction. For example, in some configurations, a user interacting with a container for the base content may cause a menu with supplemental content to appear. Examples of these configurations are shown in FIGS. 2B and 2C with the double-edged arrows representing selective display-ability or selective hide-ability.

Figure 2D:
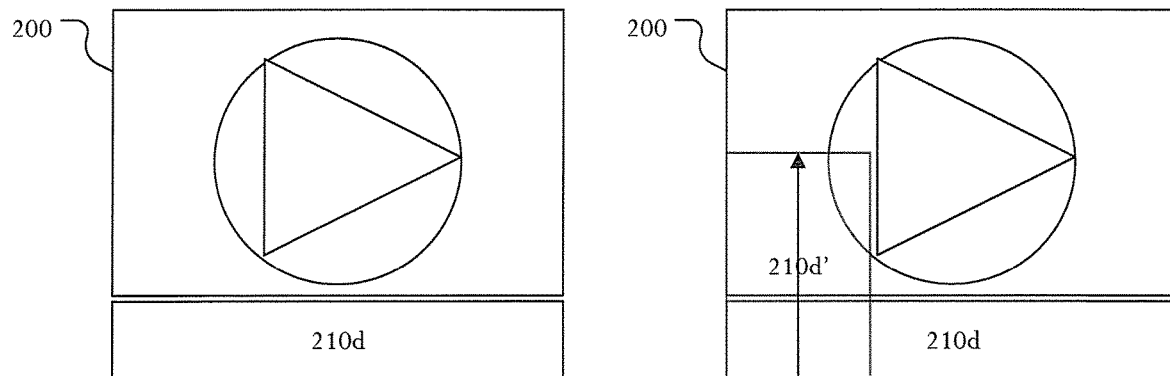
Figure 2E:
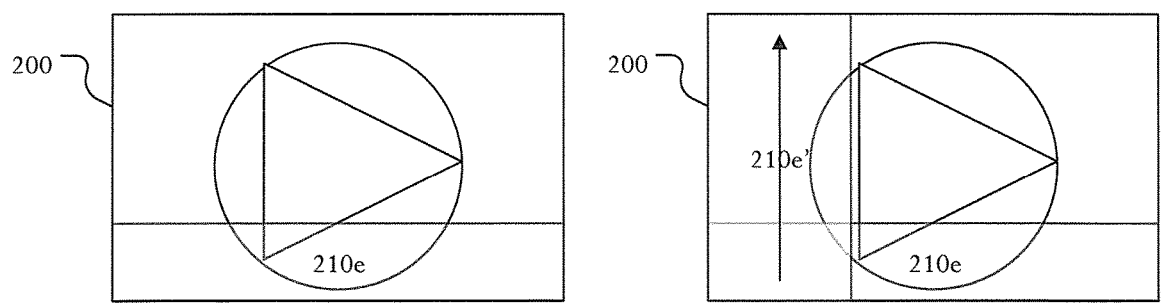

In still other configurations, the supplemental content may begin outside an area of the base content 200 and expand to cover, partially transparent or not, the base content 200. For example, as seen in FIG. 2D, the position of the supplemental content 210d on the left is just below a displayable area for the base content 200. However, in the position of the supplemental content 210d on the right (which may be the result of interactivity by a user), the supplemental content 210d expands to at least partially overlay the base content 200 (as shown by an area 210d'). A similar configuration is also shown in FIG. 2E except that the supplemental content 210e began as an overlay of the screen and an area 210e' covers an entire edge of the displayable area for the base content 200.

In particular configurations, the supplemental content is independent of the base content 200 and is bound dynamically as the base content is displayed. For example, in particular settings, a web page may have a container (such as an embed code) that instantiates (loads or invokes) (i) the base content and (ii) the supplemental content. According to certain configurations, a call for supplemental content can be based on what is being shown in the base content, with the supplemental content specifically relating to the base content. Additionally, the supplemental content may be based on other parameters, such as a user profile or a geolocation of the user viewing the base content. As another example, in other configurations, a page analyzer can review a web page to determine locations where base content is contained and overlay or adjust such base content.

According to this specification, the concept of "binding" refers to associating supplemental content with base content, whereas "dynamic binding" refers to associating content on the fly, such as upon detection of the base content. In particular configurations, the initial association may allow the subsequent sharing of both the supplemental content and the base content together, as will be described with reference to figures below. More particularly, in certain configurations, an initial dynamic binding yields a shareable container (which may or may not be instantiated by an embed code) that, upon being shared to a new device, instantiates the underlying base content and the supplemental content. In other configurations, no such container is created, and a dynamic binding or dynamic association of the supplemental content is done for every playing of the video. In yet other configurations, supplemental content may be bound to a video, and the particular content is dynamically determined when the video is requested for playback.

A variety of technologies may be used for the above-described dynamic binding. As an example non-limiting configuration, the supplemental content may be configured as one layer in a display, where the base content is another layer. In such configurations, the layer for the supplemental content may be forward in the layers to allow an overlay as might be appropriate. In other configurations, the supplemental content may simply be provided a positioning with respect to the base content.

In particular configurations, the supplemental content can be dynamically sized based on a determined size of the base content and/or the spacing configurations for the device on which the base content and the supplemental content will be displayed. In other configurations, given a particular size for the base content, the supplemental content may use the same size for a container that requests a slightly reduced-size base content with extra room for the supplemental content. In implementing such a configuration, the technology can intercept a request for the base content and redirect such a request in order to request a container that, in turn, requests the base content and then the supplemental content. This latter configuration may be beneficial for scenarios where the supplemental content does not overlay the base content.

In particular configurations, the supplemental content can be based on what is being shown in the base content 200. A variety of technologies may be utilized to recognize the base content 200. Additionally, in particular configurations, a combination of technologies may be utilized. Further, as discussed in more detail below, the supplemental content can be customized depending on a user and/or device.

One problem faced by advertisers in an online environment is an inability to track advertising unit success from attraction to transaction, which (if captured) could yield analytical data about why a user clicked on an advertisement (among other things). To combat this inability, advertisers have traditionally turned to third-party analytic providers. However, such third-party analytic providers are only able to record analytical data when a retailer or shopping site (which is usually separate from both the advertiser and the third-party analytical provider) places deep tags that link back to the third-party analytical provider. If the retailer or shopping site incorrectly places the tag, the data is lost. Given such a disparate multi-entity approach, certain embodiments of this disclosure provide a single platform that has the ability to track certain psychographic, demographic, geographic, and behavioral variables to give a holistic reflection of how, why, who, where, and when an individual, group, segment, organization, geographic region or area, and/or profile has, will, or may interact with the platform.

In particular configurations, such a platform may provide a way to target the proper video or products to the proper audience based on profiles and criteria, which in turn are based on data collected within the platform. As a non-limiting example, the gathered data may indicate that a user shops at a certain hardware or home goods store and likes to purchase lumber and power tools (behavioral). Further, gathered demographic information may indicate that this user is a male, within a certain age range or specific age, and has a certain level of income. Additionally, gathered geographic information may indicate that this user is someone who lives in a certain city. Yet additionally, the gathered data may be psychographic information that indicates that this user spends a lot of time viewing a particular news station and is a member of a certain political party (psychographic). Also, in particular embodiments, such a platform may obtain information from tracking cookies and information available within browsers, along with user profile data/behavior in interacting with the platform. This gathered information provides a unique ability to target a complete user experience of targeting products and services to desired video.

Figure 3:
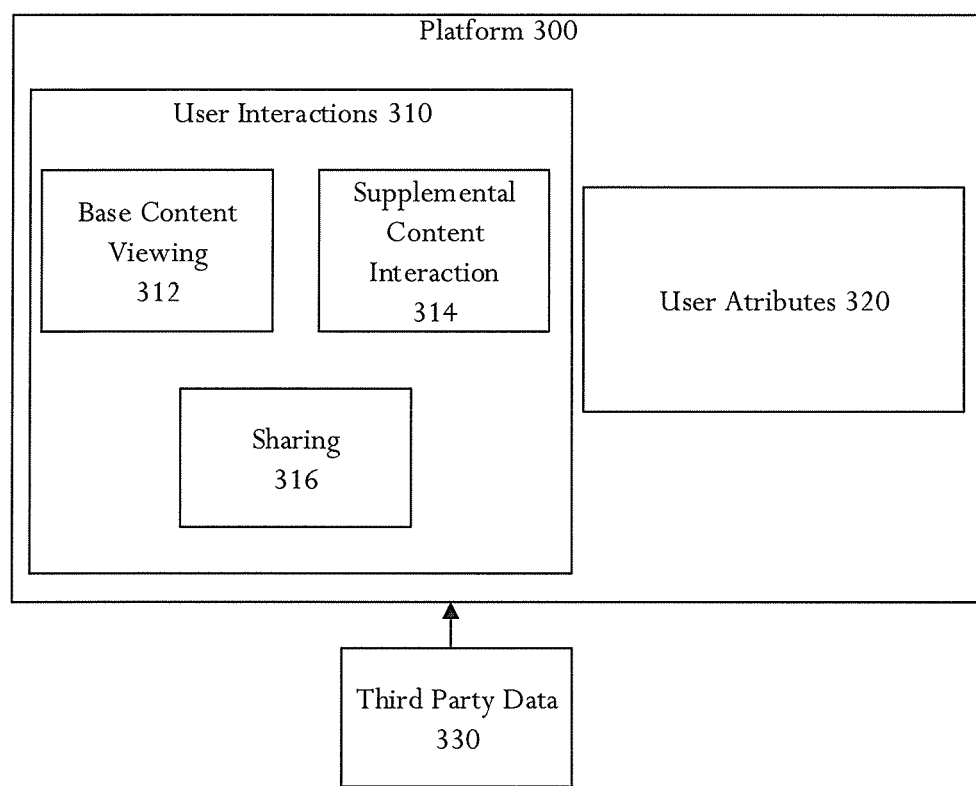
FIG. 3 illustrates an example platform for gathering analytical data according to this disclosure.

FIG. 3 illustrates an example platform 300 for gathering analytical data according to this disclosure. The platform 300 of FIG. 3 may be particularly well-suited for transmitting and/or receiving data associated with the base content 200 and the supplemental content 210 discussed with reference to FIGS. 2A-2E as well as the SMART CONTAINER objects or code referenced above. As described here, the supplemental content 210 may contain interactive items that allow users to purchase products or services being displayed within the base content 200. Additionally, as part of the supplemental content 210 or separate therefrom, options to share the base content 200 and the supplemental content 210 can be provided. Non-limiting sharing examples include sharing via a social network like FACEBOOK, GOOGLE+, and LINKEDIN; sharing via an embed code (such as code inserted into a blog or a website); and sharing via an email.

The platform 300, according to certain configurations, can include data collection components, such as a user interaction component 310 and a user attributes component 320. Additionally, as recognized by particular embodiments of the disclosure, some data may enter the platform as third-party data 330 collected by systems other than the platform 300. A non-limiting example of third-party data includes a profile, such as a social media profile, that has been developed corresponding to a user (including, but not limited to, FACEBOOK shadow profiles).

The user attributes component 320 can generally record any number of attributes, whether such attributes concern an actual user or devices the user utilizes. Non-limiting examples of user attributes include a geographical location, IP address, device identifier (such as a MAC address), data in browser cookies, items posted in a header that identify a client (such as a GOOGLE CHROME browser), a time of day, and an environment in which the user is interacting (such as viewing the content on a FACEBOOK page).

The user interaction component 310 focuses on interaction information that includes user interactions, such as (1) user interactions with the base content (like watching the content), (2) user interactions with supplemental content (like information about past purchases), and (3) information about the user's sharing of the base content or the supplemental content with other people. These types of interactions have been respectively labeled as base content viewing subcomponent 312, supplemental content subcomponent 314, and sharing subcomponent 316, respectively.

The base content viewing subcomponent 312 measures a user's engagement with base content 200. For example, if the base content 200 is video, the base content viewing subcomponent 312 can measure some or all of the following: how many seconds and what portions of the base content 200 are watched, when a user pauses/fast-forwards or skips/rewinds, what views are watched (in configurations where multiple views of an event are provided), eye tracking information related to where the user's eyes are focused on the video, and clicking information related to where a user moves a mouse, hovers, or clicks a mouse.

The supplemental content subcomponent 314 measures a user engaging with supplemental content 210. Examples of measured items may include some or all of the following: when and how many times a user engages with an interactive portion, what level of interaction occurs (such as in scenarios where multiple levels of interaction are provided), whether an item is placed in a shopping cart (including the details of what is added), and whether a product is purchased (including the details of what is purchased).

The sharing subcomponent 316 measures what, to whom, and in what manner a user chooses to share content. For example, where a user chooses to embed content in a web page or a social blog, a unique number for the embed code when executed can inform the platform 300 as to where the copied version of the shared base content or supplemental content is shared. As another example, where content is emailed or texted to another user (which in particular configurations can be done through the system), data is gathered as to the particular other users, as well as any description provided by the sharing user. As yet another example, where content is shared to a social page (such as FACEBOOK, GOOGLE+, LINKEDIN, or the like), the particular user page can be noted. Additionally, when a "like" or "+1" occurs, the propagated content can further report back to the platform 300 where it arrives at next. As will be appreciated by one of ordinary skill in the art having read this specification, a chain of sharing can be derived to determine the manner and at what speed content is propagated through various networks.

Additionally, according to particular embodiments, such gathered statistics can be used in an affiliate or multi-level-marketing (MLM) scenario to determine appropriate commissions, percentages of sales, or revenue shares as a result of user actions. In MLM, independent non-salaried participants, referred to as distributors (or associates, independent business owners, dealers, franchise owners, independent agents, etc.), are authorized to distribute products or services. The distributors are awarded retail profit from customers plus commission, not downlines, through a multi-level marketing compensation plan, which is based upon the volume of products sold through sales efforts as well as that of a downline organization. Independent distributors develop organizations by either building an active consumer network, who buy direct, or by recruiting a downline of independent distributors who also build a consumer network base, thereby expanding the overall organization. Additionally, distributors can also earn a profit by retailing products they purchased from the company at wholesale price.

Because containers having base content and supplemental content are self-contained, they can travel across heterogeneous networks (such as email, FACEBOOK, GOOGLE+, and LINKEDIN), and the platform 300 can still track the lineage (such as a downline in an MLM scenario) of the shares. Because this can be tracked, an affiliate or MLM determination can be made. As an example of this, a particular transaction within a container created by code may occur. A search through the share history (back up the line) can be performed to determine whether a portion of the transaction should be credited to the user(s) in the "upline" that shared the content.

Affiliate and MLM tracking can be done per user (regardless of content shared) or per base content identifier (which may be several alternative forms of the base content). Additionally, because of the level of data gathered, a commission may be modified using such gathered data. For example, a commission may be modified based on a volume of referrals, an activity level of a sharing user, or a consideration of whether a particular user created the base content (such as a video). Yet other commission modifications based on gathered analytics may also be utilized.

Because all of these various types of data are gathered and/or processed by the same platform 300, a variety of correlations between different data avenues can yield answers as to what is effective and what is not. For example, the platform 300 can determine that a certain group of users are all interacting with certain interactive content and/or choosing to share content around a same time during a display of base content. Such a correlation may indicate that a particular showing in the base content triggers something in users to act.

Given the variety of different data collected by the platform 300, a variety of questions can be answered, such as but not limited to:

What do people of a certain graphic watch?
What interactive components best capture their attention?
When do certain groups of people shop?
Where do certain groups of people shop?
What devices do certain groups of people shop from?
What are certain users' purchasing habits?
What is the engagement rate and event tracking (such as start, stop, mute, full screen)?
What is the digital video impression served (total ad displays)?
What is the unique Reach (the number of unique people who saw an ad)?
What is the Frequency (the number of times a viewer is exposed to the ad before clicking)?
What is the GRPs (the number of impressions in relation to the size of the audience)?
What is working well?

According to particular embodiments of this disclosure, the platform 300 may provide the ability to track impressions, a cart, a checkout page, a payment completion page, and transaction details (including refunds) within a single video e-commerce system. This also includes and extends to the social aspect and advertising space where code propagating base content and supplemental content is outside or beyond the boundaries of a single e-commerce platform or website.

For web designers, a webpage is allocated certain sections for design, form and function. Some areas are for content, advertising, social interactions, graphics, promotion, and the like. However, the platform according to particular embodiments here can exist in any area within a website (given size constraints) and allows for e-commerce transactions no matter where it is displayed, without doing a click or redirect to a central site to complete the transactions.

This e-commerce capability within a store provided by the code provides a unique ability to target content and e-commerce players based on behavior and other factors mentioned above. Also, this capability provides the platform with the ability to collect data in a single repository, including transactional details and refunds back to a decision engine.

In some embodiments, an e-commerce website can track details about transactions and user behaviors within its own website. As an example, the platform 300 can track transactions and purchase behaviors within the platform wherever the code is included, including other websites. The code can also behave as an ad unit to be included in any other website, allowing it to target the appropriate base content and supplemental content based on the user and to track store and transactional behavior accordingly. When using pre-recorded video, the system may use metadata from a repository; when using live video, the system may use information from a television guide or manual entry.

In particular embodiments, base content can be provided in different angles. Each angle can include different metadata, and the supplemental content provided with each angle can vary. For example, some objects in the base content may be seen from one angle but not another angle, and supplemental content related to objects seen in only one angle may be provided for that angle.

Also, in particular embodiments, the platform 300 may identify supplemental content based on other merchants with similar products. The platform 300 may also identify supplemental content based on what products sell well with a particular base content. The platform 300 may also identify supplemental content based on seasonality or what has sold well to other users or friends similar to the user.

Figure 4:
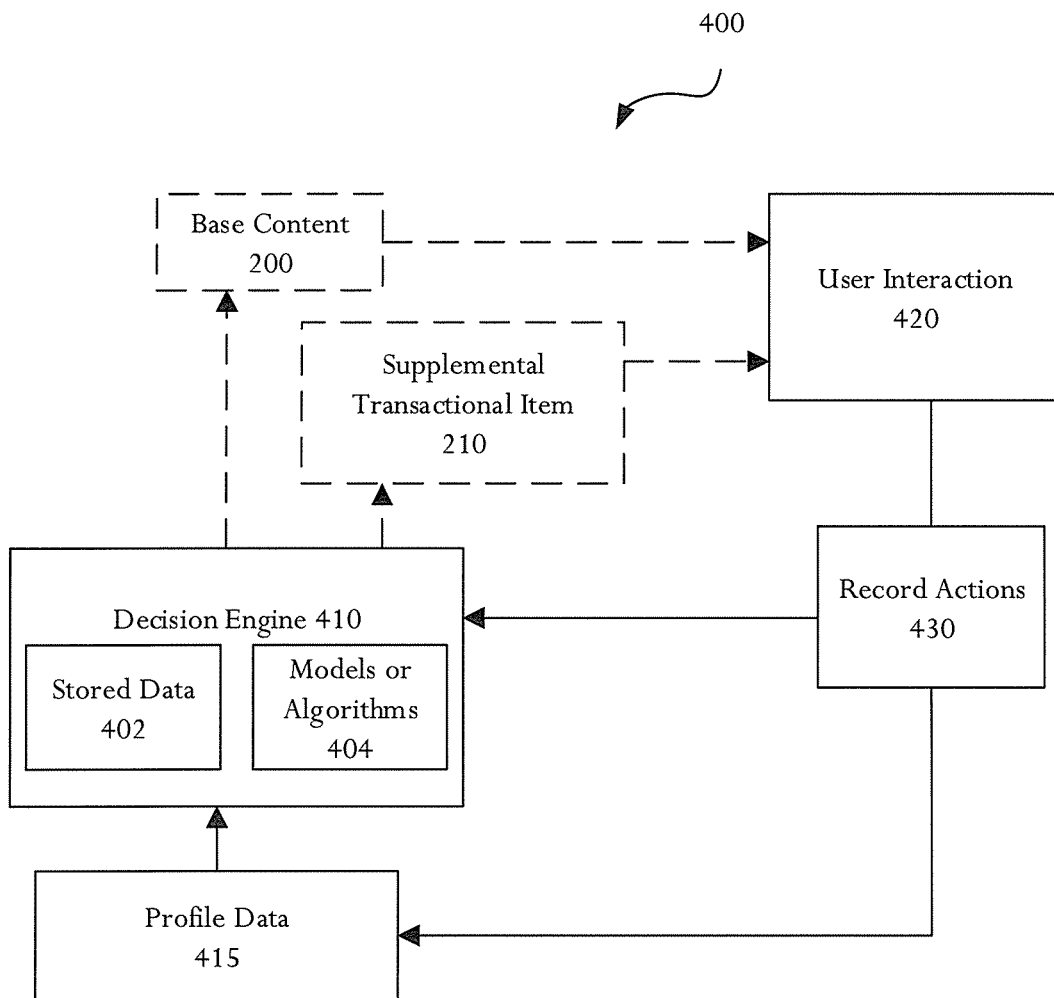
FIG. 4 illustrates an example dynamic feedback system illustrating how base content and supplemental content are optimized for a user according to this disclosure.

FIG. 4 illustrates an example dynamic feedback system 400 illustrating how base content and supplemental content are optimized for a user according to this disclosure. The dynamic feedback system 400 includes a decision engine 410. In some embodiments, the decision engine 410 may include or represent one or more servers (such as database servers and application servers) to apply decision logic as to what is going to work best for a particular user. In an example embodiment, the decision engine 410 could implement the platform 300 shown in FIG. 3.

In some embodiments, the decision engine 410 determines what base content 200 and supplemental content 210 should be presented to a user. The decision engine 410 can make this determination based on stored data 402 concerning previously-gathered data or other data, user profile data 415 concerning profiles of different users, and models or algorithms 404, After the base content 200 and the supplemental content 210 are supplied to a user, user interaction 420 with such base content 200 and supplemental content 210 can occur. The user's actions can be recorded and fed back into the decision engine 410 and the profile data 415.

Using dynamic feedback system 400, the decision engine 410 in particular configurations can learn from data associated with previous interactions and modify itself over time. According to particular configurations, the models or algorithms 404 in the decision engine 410 can account for longer-term data and shorter-term data. For example, the decision engine 410 may determine that a certain supplemental content 210 and/or base content 200 is seasonal and distinguish such items from something that is trending in a non-seasonal manner.

Although described as a decision engine 410, in different configurations, the decision engine 410 can provide test data points simply for consideration of the response, tweaking a test database on real-time feedback. The decision engine 410 can iterate through a number of scenarios to yield an optimized solution.

Although the system 400 is described as optimizing both base content 200 and supplemental content 210, in other configurations the dynamic feedback system 400 may only optimize supplemental content 210, such as in scenarios where the base content 200 is fixed. In such scenarios, the dynamic feedback system 400 may only optimize the supplemental content 210.

Figure 5:
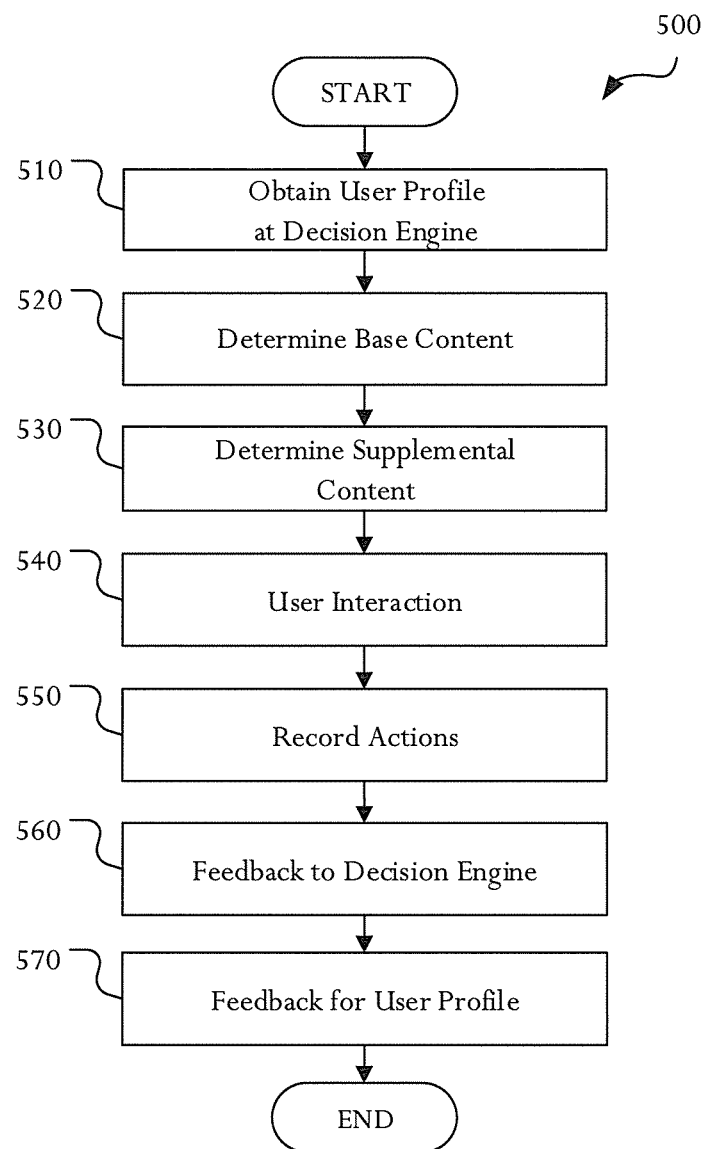
FIG. 5 illustrates an example process for dynamic feedback according to this disclosure.

FIG. 5 illustrates an example process 500 for dynamic feedback according to this disclosure. For ease of explanation, the process 500 is described with reference to the dynamic feedback system 400 of FIG. 4. At step 510, a user profile is obtained by a decision engine. The user profile may include data gathered by the platform 300 of FIG. 3, other user data that has been gathered, data entered by the user, or a combination thereof.

At steps 520 and 530, the decision engine determines base content and supplemental content that is optimal for the particular user. As described here, this decision may be based on the user profile, data accessible by the decision engine (such as user data, geographic data, demographic data, and the like), and algorithms or models). At step 540, a user interacts with one or both of the base content and the supplemental content. Such user interactions may include any of a variety of different uses interactions that are apparent to one of ordinary skill in the art. At step 550, the actions of the user in such interactions are recorded. In particular configurations, this may happen simultaneously with step 540.

At step 560, feedback is provided to the decision engine. This feedback may update the aggregate data collected for a plurality of users and/or the algorithm or model used for making decisions. At step 570, feedback is provided to the user profile. This feedback, among other things, may be used to update the user profile. The feedback may also be used to update other user profiles or used in presenting content to other users. For example, if one user lives in a state and cheers for a certain sports team related to that state, another user in that same state may cheer for the same sports team.

FIGS. 6A and 6B illustrate an example dynamic creation of base content according to this disclosure. For the purpose of illustration, the base content in FIGS. 6A and 6B will be described as a video, although other types of base content may be created.

A particular video to be displayed to a user may be determined by the decision engine 410. With a host of data available, the decision engine 410 may determine what sequence of segments is appropriate and what pre-roll and post-roll segments are also appropriate. In particular configurations, the different segments may correspond to different camera angles or different versions of the same movie or event.

With reference to FIG. 6A, segments A1, B1, and C1 have been selected along with a fifteen second pre-roll and a thirty second post-roll. The fifteen second pre-roll segment may have been determined based on a statistical analysis that a fifteen second pre-roll works better than a thirty second pre-roll because the user is female. Further, the A1, B1, and C1 segments may have been determined because the camera angle is better for products that a female is likely to purchase.

With reference to FIG. 6B, segments A2, B1, and C2 have been selected along with a thirty second pre-roll and a thirty second post-roll. The thirty second pre-roll segment may have been determined based on a statistical analysis that a thirty second pre-roll works better than a fifteen second pre-roll because the viewer is male and males tend to enjoy the longer pre-roll. Further, the A2 and C2 segments may have been chosen because the camera angle is better for products that a male is likely to purchase. Additionally, B1 (although more likely to have products that a female would purchase) may have been determined to be of interest to a male viewer based on a previous purchase for a girlfriend or spouse. The above are non-limiting examples of how base content can be dynamically created. Other examples are apparent to one of ordinary skill in the art after having read this specification.

Figure 7A:
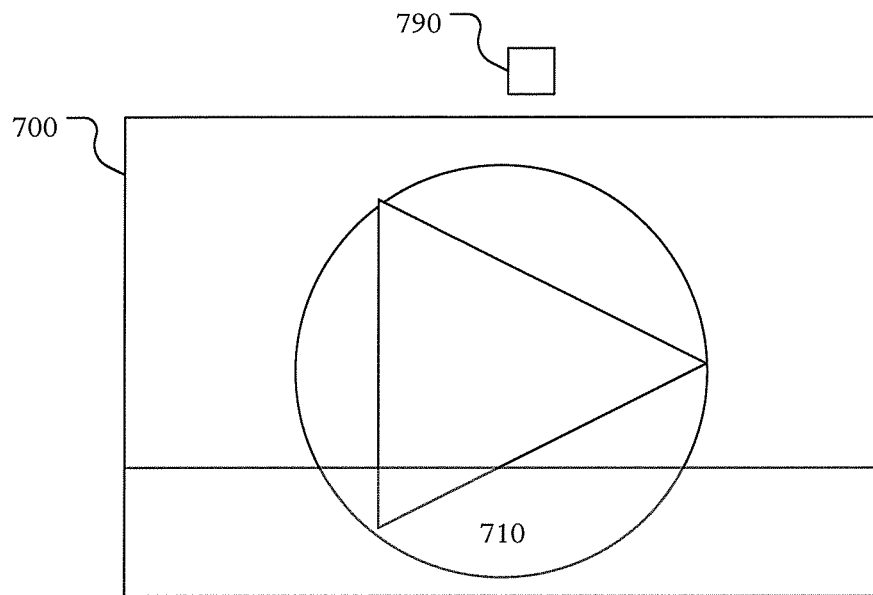
FIGS. 7A and 7B illustrate example advanced collection of analytics according to this disclosure.
Figure 7B:
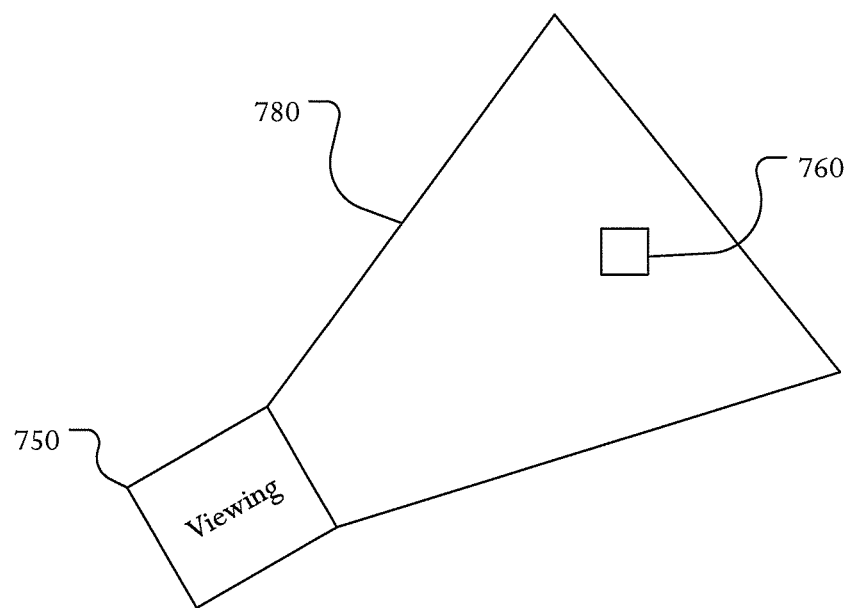

FIGS. 7A and 7B illustrate example advanced collection of analytics according to this disclosure. With reference to FIG. 7A, base content 700 and supplemental content 710 are displayed. A sensor 790 records a user's eye movement in viewing the base content 700 and supplemental content 710. Without the user interactively selecting something, the sensor 790 can gather data that indicates the user is interested in something within the video. As an example, the sensor 790 can sense the whites of the user's eyes to determine the angle at which the eyes are positioned. Moreover, the sensor 790 can detect how little or much the eyes are opened to change a changing level of interest. Yet other eye tracking technologies will become apparent to one or ordinary skill in the art. In particular configurations, the sensor 790 may detect that they eyes have moved over a virtual hotspot that is invoked upon focusing on the virtual hot spot for a determined time. The focus time may be a threshold period of time that is dynamically changed, predetermined, or manually adjusted. Such eye tracking technologies may be implemented in mobile devices, computers, set-top boxes, or other devices. When such eye-tracking data is gathered, the data can be fed back to the decision engine 410 and the user's profile as described above.

With reference to FIG. 7B, a geographic location of an item 760 is known. Upon knowledge of the view 780 (two-dimensional view or three-dimensional spatial view) of a user 750, a level of interest of the object may be determined. As a non-liming example, using geo-location sensors, compass data, and inclinometer on GOOGLE GLASSES, the three-dimensional geo-spatial view of a wearer can be determined. Further, upon knowledge of location of the objects, when the two are correlated, a determination as to a level of interest in a particular object can be determine based on how long the object is viewed or how long the person is in front of the object. Such location focus data can be fed back to the decision engine 410 and the user's profile as described above.

Embodiments of this disclosure also recognize and take into account that a problem faced by vendors in an online environment is when to post advertisements and when to determine when to sell different products. Sometimes, when the vendor has a certain number of posting of advertisements set over a period of time, the vendor must manually make any adjustments to the number of postings for that period of time or manually make adjustments to the period of time. During the time between recognition of needing to make the adjustments and manually making the adjustments, the vendor is losing out on sales.

Certain embodiments of this disclosure provide for the monitoring of social networks and news feeds for trending topics. For example, if a sports team is playing in a sporting event and wins, there may be a large number of social media updates regarding the winning team. Additionally, in some embodiments, a vendor may be able to have a higher frequency of postings if the vendor's products relate to the event, sport, winning team, and the like. In other embodiments, vendors' products may relate to a trending topic and are displayed in higher priority.

Figure 8:
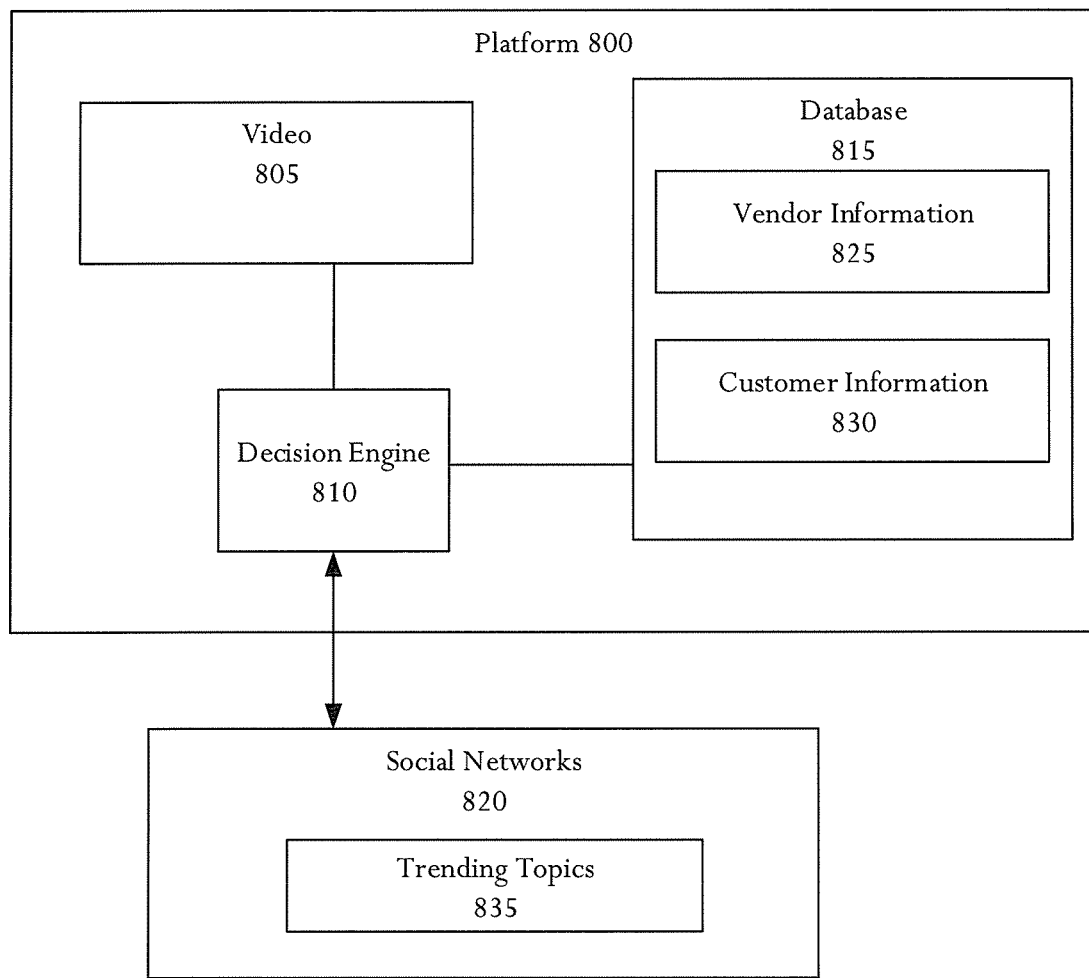
FIG. 8 illustrates an example platform for a social network monitoring system according to this disclosure.

FIG. 8 illustrates an example platform 800 for a social network monitoring system according to this disclosure. The platform 800 of FIG. 8 may be well-suited for serving up and/or receiving data associated with the base content 200 and the supplemental content 210 discussed with reference to FIGS. 2A through 2E, as well as the SMART CONTAINER objects or code referenced above. As described here, the supplemental content 210 may contain interactive items that allow users to purchase products or services being displayed within the base content 200. Additionally, as part of the supplemental content 210 or separate therefrom, options to share the base content 200 and the supplemental content 210 can be provided. Non-limiting sharing examples include sharing via a social network like FACEBOOK, GOOGLE+, and LINKEDIN; sharing via an embed code (such as when inserted into a blog or a website); and sharing via an email.

The platform 800 according to certain configurations can have a video 805, a decision engine 810, and a database 815. The decision engine 810 can be configured to monitor trending topics 835 from social networks 820 and relate that with vendor information 825 in the database 815. The decision engine 810 can be one example of the decision engine 410 of FIG. 4. In some embodiments, vendor information 825 may include but is not limited to what products the vendor currently sells, what logos are associated with the vendor, what markets are related to the vendor, and the like. Additionally, as recognized by particular embodiments of this disclosure, the database 815 may also include customer information 830. Customer information 830 may indicate trends and statistics on customers' purchases. A non-limiting example of the customer information 830 may be to indicate specific interests of specific customers.

In some embodiments, the decision engine 810 can be configured to retrieve trending topics 835 from social networks 820. The trending topics 835 can be keywords, hashtags, categories, and the like. As an example, the decision engine 810 can match keywords and hashtags and repost pre-loaded text automatically. The decision engine 810 can leverage trending words, phrases, and hash tags to maximize views and search engine optimization.

In other embodiments, the decision engine 810 can be configured to retrieve data 820 and vendor information 825. The decision engine 810 can identify trending topics 835 and target customers that have tendencies for those trending topics by searching through customer information 830. As an example, if a trending topic is a sporting event, the decision engine 810 may be configured to search customer information 830 for customers who purchase products related to the sport of the sporting event and present postings for vendors with similar types of products. As a particular example, the decision engine 810 may select specific vendors based on the trending topics 835 and/or the customer information 830. Customer information 830 may also be part of a user profile.

Based on the extracted information from the trending topics 835, information on available video assets (such as the video 805) and items in the database 815, the decision engine 810 can provide base content and supplemental transactional items that complement the trend. In other words, where a social wave is occurring, the decision engine 810 analyzes the wave and identifies what content is available to compliment the energy of the wave. Dynamically-created containers can be injected into the wave, where the video 805 is the attracting mechanism and the products and services of the supplemental content may be bought on impulse. To engage with the trend and drive traffic to web destinations containing SMART CONTAINERS in particular configurations, the decision engine 810 may also make general or targeted supplemental social media posts, post blog entries on web sites, and send or augment promotional emails.

Figure 9:
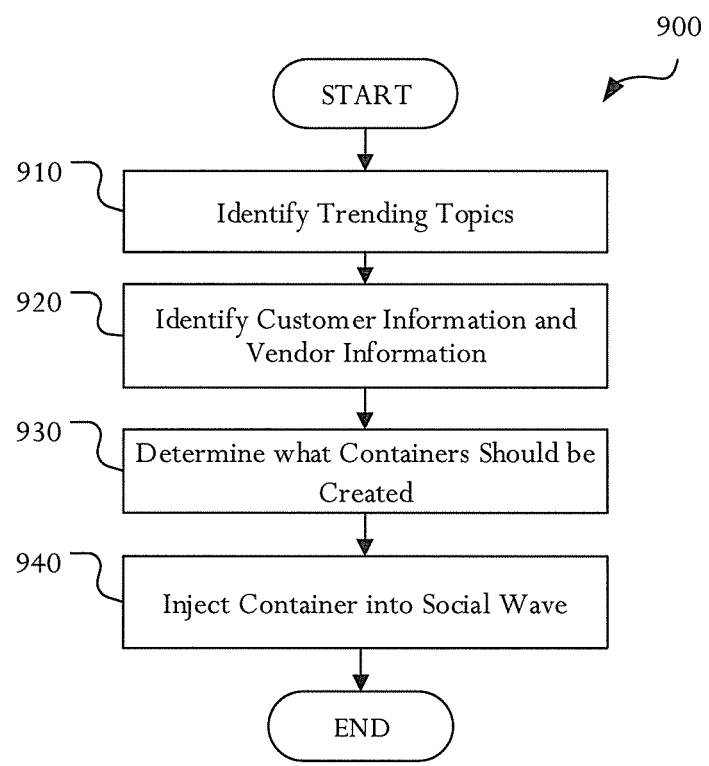
FIG. 9 illustrates an example process for configuring content based on social trends according to this disclosure.

FIG. 9 illustrates an example process 900 for configuring content based on social trends according to this disclosure. For ease of explanation, the process 900 is described with reference to the platform 800 of FIG. 8. At step 910, a decision engine identifies trending topics in social networks and media. At step 920, the decision engine identifies customer information and vendor information from a database. The database may include a historical record of past purchases, as well as information related to vendors and customers. At step 930, the decision engine can determine what containers should be created. The determination may be based on a combination of trending topics, vendor information, and customer information. For example, the decision engine can identify the trending topics and then select vendors that relate to those trending topics and customers that are more likely to purchase products or services related to those trending topics. At step 940, the decision engine may inject the container into the social wave.

In addition, embodiments of this disclosure provide a mechanism for utilizing crypto-currency (including vanity crypto-currency) as a method of collecting analytics for a web page, smart object, or element(s) within a page or object. Crypto-currency can be accumulated in a variety of ways. In a conventional method, crypto-currency can be earned or awarded based on user interaction events or programmatically triggered events. Embodiments of this disclosure can obtain and use any and all unique identifiable information that is available (such as IP address, user agent, and browser plugins/fonts/settings), which provides the ability to track users and obtain user information without the user needing to be logged into a system.

Examples of analytics and information that can be collected via crypto-currency and block chain systems include views, impressions, uniqueness, time, events, transactions, campaign and/or targeted sub page or element, social, geo-location, audience data, content data, and the like. A block chain is a public ledger that records crypto-currency transactions. Maintenance of the block chain is performed by a network of communicating nodes running crypto-currency software. Transactions are broadcast to this network, and network nodes can validate transactions, add them to their copy of the ledger, and broadcast these ledger additions to other nodes. The block chain is a distributed database, and each network node stores its own copy of the block chain in order to independently verify the chain of ownership of any and every crypto-currency.

Various embodiments of this disclosure provide for mining crypto-currency for analytics through video and product interaction as well as website analytics. In video and product interactions, defined actions (such as a video start, watching a pre-roll, or opening a product flow) could start client-side mining of a crypto-currency. With site analytics, background JAVASCRIPT or other mechanism on the client side could trigger once a page has loaded to start mining a crypto-currency and could continue for its duration on that page. Any information mined from crypto-currency can be referred to as currency information. This process could also be used to track ad impressions and duration on screen for third party sites, such as by using an HTML5 ad with the mining JAVASCRIPT that is embedded. Any of the processes here could be cross-referenced from the block chain to access logs in order to track interaction duration, as well as actions that have triggered mining to occur (such as playing a video or visiting a particular page on a site).

Some embodiments of this disclosure also provide for using crypto-currency transactions for analytics. In video and product interactions, defined actions and checkpoints (such as a video start, watching a pre-roll, waypoints on the video, or opening a product flow) could trigger a transaction from a "hot wallet" that is filled with pre-mined coins, which would allow memos to be added with details about the interaction type. With site analytics, background JAVASCRIPT or other mechanism on the client side could trigger once a page has loaded to send an initialization transition and, at designated or random checkpoints, trigger additional transactions and could continue for its duration on that page. This process could also be used to track ad impressions and duration on screen for third party sites, such as by using an HTML5 ad with the mining JAVASCRIPT that is embedded. Any of the processes here could be aggregated from the block chain to build a complete analytics picture for each user.

Some embodiments of this disclosure further provide for the use of the crypto-currency block chain and wallet to calculate and accumulate statistics within a web page, smart object, or element within a web page. These embodiments of this disclosure can recognize and take into account that the crypto-currency block chain provides a distributed public ledger of transactions. This verifies chain of ownership of every transaction. Each transaction would represent the analytics being tracked.

Moreover, some embodiments of this disclosure provide for the utilization of crypto-currency and the block chain to instantiate an analytics collection system associated with events, triggered and automatic, within a web page, smart object, or element(s) within a web page or smart object, which can be referred to as a "target object". In some example embodiments, the system tracks start and stop times for duration of video watched utilizing the block chain. In other example embodiments, the system tracks purchase and transactional events within smart object e-commerce systems. In yet other embodiments, the system tracks "target objects" that can include the following:

Views: collection of presentation of the target object

Impressions: collection of instantiation of the target object

Uniqueness information: collection of user and computer information to track uniqueness of a viewer over time. For example, reporting can be done to determine variable time windows and uniqueness of visitors and visitor events.

Time information: collection of length of time accumulated for time analytics. For example, with time-stamping within the block chain, analytics can be tracked for start and stop time stamps for a "target object." In some examples, this could be time spent on page, time video played, time video paused, average place paused or stopped, and net time spent.

Events: General events with a "target object" to include interactive events such as "click" or "hover" or "mouse" or load or unload events. These events can be triggered automatically or manually.

Transactions within an e-commerce system, shopping cart, or smart object: These could include stock keeping unit (SKU), cart, cart abandonment, affiliate or referrer attribution, and other elements tracked. This type of tracking finds popular products and conversion reports. This type of tracking also finds effective and ineffective portions of the site based on referral, completion, and abandonment.

Campaign and/or targeted sub-page or element: this type of tracking allows additional layers of analytics within a page or element Social interactions: within a smart object and embedded elements within social networks would be able to be tracked utilizing the block chain without requiring social networks to embed additional code Embedded smart objects or elements on third party pages: could be able to collect analytics from a smart object without requiring third party pages to change or embed additional elements or scripts beyond the "target object" being embedded.

Geo-location information: could be tracked and collected based on mobile or internet protocol information of the user Audience data: tracks data of the types of people and their information to determine audience makeup and loyalty Content data: tracks analytics that allows the content provider that ability to setup comparative analysis between multiple content elements to test and determine content effectiveness.

Figure 10:
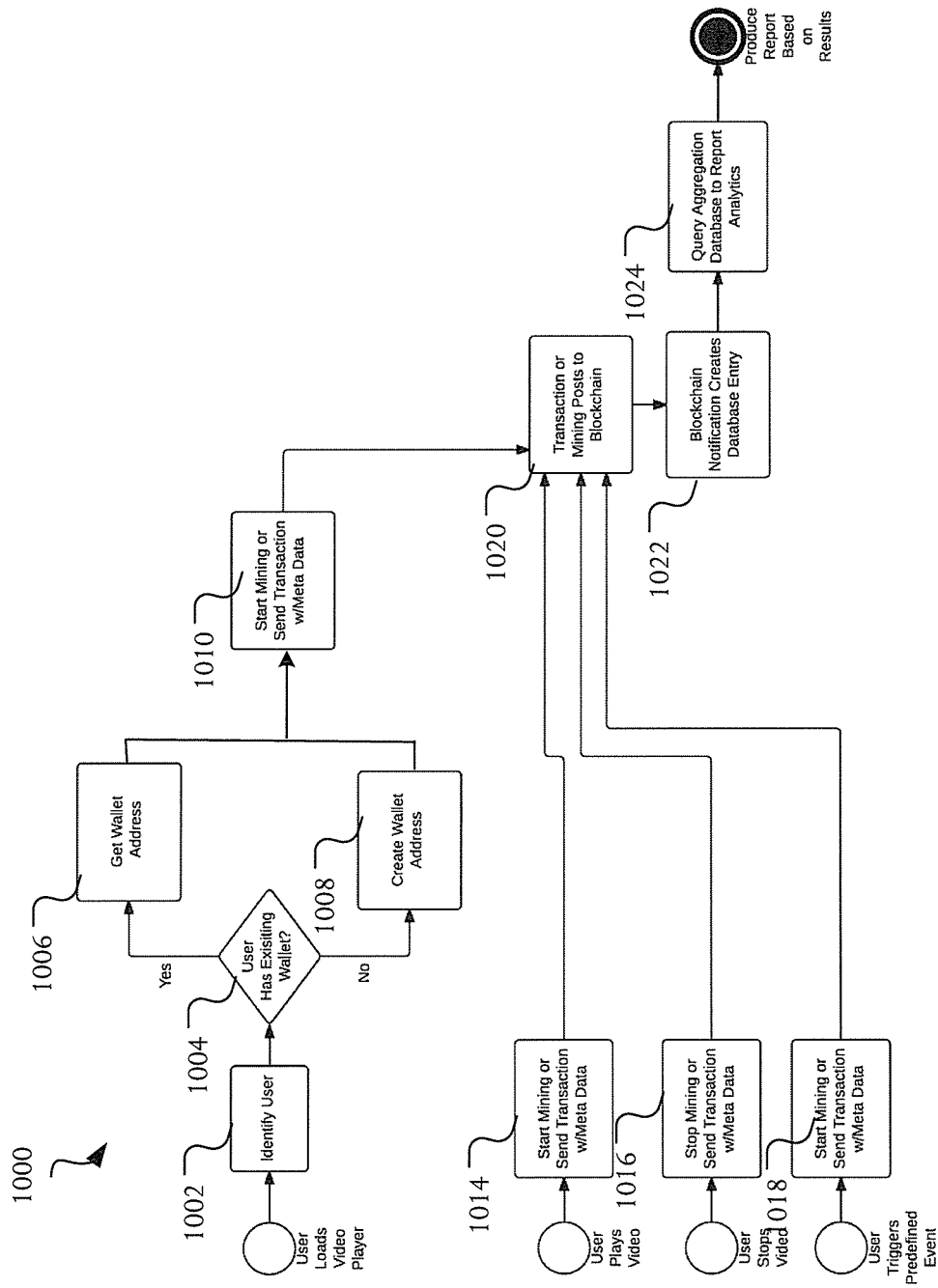
FIG. 10 illustrates an example process for mining transactions with video according to this disclosure.

FIG. 10 illustrates an example process 1000 for mining transactions vwith video according to this disclosure. For ease of explanation, the process 1000 is described with reference to the platforms 300, 800 of FIGS. 3 and 8. At step 1002, responsive to a user loading a video player, a decision engine may identify the user. At step 1004, the decision engine may determine whether the user has an existing wallet. The wallet may be a wallet for a crypto-currency. If so, the engine may get the wallet address at step 1006. Otherwise, the engine may create a wallet address at step 1008. At step 1010, the decision engine may start mining or send the transaction with metadata to a block chain.

At step 1014, responsive to a user playing a video, the engine may start mining or send the transaction with metadata to a block chain. At step 1016, responsive to a user stopping a video, the engine may start mining or send the transaction with metadata to a block chain. At step 1018, responsive to a user triggering a predefined event, the engine may start mining or send the transaction with metadata to a block chain.

At step 1020, a transaction or mining posts to a block chain. The posting can come from operations 1010-1016, as well as other transactions. At step 1022, the block chain creates a database entry. The entry can be of the transaction and information related to the transaction. At step 1024, the engine can query the database to report the analytics. The report can be sent to a vendor or merchant.

Figure 11:
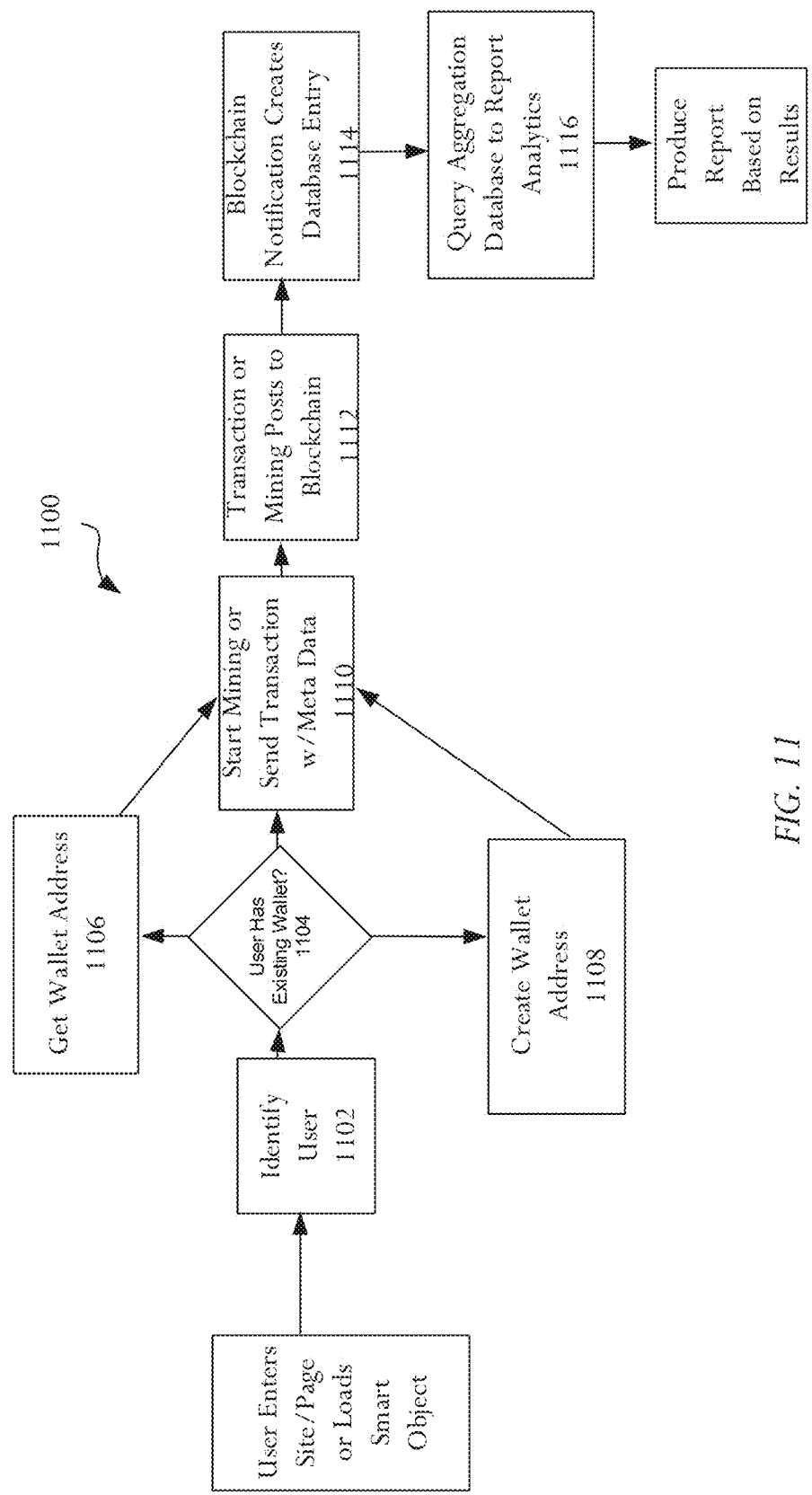
FIG. 11 illustrates an example process for mining transactions with website analytics according to this disclosure.

FIG. 11 illustrates an example process 1100 for mining transactions with website analytics according to this disclosure. For ease of explanation, the process 1000 is described with reference to the platforms 300, 800 of FIGS. 3 and 8.

At step 1102, responsive to a user loading a website or smart object, a decision engine may identify the user. At step 1104, the decision engine may determine whether the user has an existing wallet. The wallet may be a wallet for a crypto-currency. If so, the engine may get the wallet address at step 1106. If not, the engine may create a wallet address at step 1108. At step 1110, the engine may start mining or send the transaction with metadata to a block chain.

At step 1112, a transaction or mining posts to a block chain. At step 1114, the block chain creates a database entry. The entry can be of the transaction and information related to the transaction. At step 1116, the engine can query the database to report the analytics. The report can be sent to a vendor or merchant.

As used in this disclosure, gathering of analytics may be described as being performed in response to certain actions or events, but the gathering of analytics could be performed in response to any other actions or events (including events within smart objects and events within a smart store).

FIG. 12 illustrates an example computing device 1200 supporting various functions according to this disclosure. The computing device 1200 here could be used to implement any of the techniques or functions described above, including any combination of the techniques or functions described above. The computing device 1200 may generally be adapted to execute any of suitable operating system, including WINDOWS, MAC OS, UNIX, LINUX, OS2, IOS, ANDROID, or other operating systems.

As shown in FIG. 12, the computing device 1200 includes at least one processing device 1212, a random access memory (RAM) 1214, a read only memory (ROM) 1216, a mouse 1218, a keyboard 1220, and input/output devices such as a disc drive 1222, a printer 1224, a display 1226, and a communication link 1228. In other embodiments, the computing device 1200 may include more, less, or other components. Computing devices come in a wide variety of configurations, and FIG. 12 does not limit the scope of this disclosure to any particular computing device or type of computing device.

Program code may be stored in the RAM 1214, the ROM 1216 or the disc drive 1222 and may be executed by the at least one processing device 1212 in order to carry out the functions described above. The at least one processing device 1212 can be any type(s) of processing device(s), such as one or more processors, microprocessors, controllers, microcontrollers, multi-core processors, and the like. The communication link 1228 may be connected to a computer network or a variety of other communicative platforms, including any of the various types of communication networks 140 described above. The disc drive 1222 may include a variety of types of storage media such as, for example, floppy drives, hard drives, CD drives, DVD drives, magnetic tape drives, or other suitable storage media. One or multiple disc drive 1222 may be used in the computing device 1200.

Note that while FIG. 12 provides one example embodiment of a computer that may be utilized with other embodiments of this disclosure, such other embodiments may utilize any suitable general-purpose or specific-purpose computing devices. Multiple computing devices having any suitable arrangement could also be used. Commonly, multiple computing devices are networked through the Internet and/or in a client-server network. However, this disclosure may use any suitable combination and arrangement of computing devices, including those in separate computer networks linked together by a private or public network.

The computing devices 1200 could represent fixed or mobile devices, and various components can be added or omitted based on the particular implementation of a computing device. For example, mobile devices could include features such as cameras, camcorders, GPS features, and antennas for wireless communications. Particular examples of such mobile devices include IPHONE, IPAD, and ANDROID-based devices.

Although the figures above have described various systems, devices, and methods related to gathering analytics, various changes may be made to the figures. For example, the designs of various devices and systems could vary as needed or desired, such as when components of a device or system are combined, further subdivided, rearranged, or omitted and additional components are added. As another example, while various methods are shown as a series of steps, various steps in each method could overlap, occur in parallel, occur in a different order, or occur any number of times. In addition, examples of graphical presentations are for illustration only, and content can be presented in any other suitable manner. It will be understood that well-known processes have not been described in detail and have been omitted for brevity. Although specific steps, structures, and materials may have been described, this disclosure may not be limited to these specifics, and others may be substituted as it is well understood by those skilled in the art, and various steps may not necessarily be performed in the sequences shown.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Other changes, substitutions, and alterations are also possible without departing from the invention as defined by the following claims.

What is claimed is:

1. A processor-implemented method for gathering analytics, the method comprising:

monitoring user interactions of users of a plurality of user compute devices related to at least one of: multiple base content and multiple supplemental content, each supplemental content from the multiple supplemental content associated with one or more products or services identified in a base content and displayed within the base content when the base content is displayed on a user compute device from the plurality of user compute devices;

obtaining and aggregating user interaction information associated with the monitored user interactions of users of the plurality of user compute devices;

selecting specified supplemental content from the multiple supplemental content to provide to a specified user compute device based on (i) the obtained and aggregated interaction information and (ii) specified base content provided to the specified user compute device;

dynamically binding the specified base content and the selected specified supplemental content to form a shareable media container, the shareable media container, when instantiated, configured to render in an interface, the specified base content and the selected specified supplemental content, the interface including a sharing user interface and a transaction user interface, the sharing user interface configured to allow a user to share an instance of the shareable media container to another compute device such that upon being shared to another compute device embed code instantiates the specified base video content and the selected specified supplemental content, the transaction user interface configured to allow the user to initiate and complete an e-commerce transaction associated with at least one of the one or more products or services within the shareable media container without diverting from the specified base content, the shareable media container being configured to monitor and collect information related to the e-commerce transaction; and sending the shareable media container including the dynamically bound specified base content and the selected specified supplemental content to an endpoint associated with the specified user compute device to be viewed by a user of the specified user compute device.

2. The processor-implemented method of claim 1, further comprising:
selecting the specified base content to present to the user of the specified user compute device based on the obtained and aggregated interaction information and user information associated with the specified user compute device.

3. The processor-implemented method of claim 1, wherein:
selecting the specified supplemental content to present to the user of the specified user compute device is further based on user information; and
the user information includes at least one of demographic information, psychographic information, and geolocation information associated with the user of the specified user compute device.

4. The processor-implemented method of claim 1, wherein:
selecting the specified supplemental content to present to the user of the specified user compute device is further based on user information; and
the user information comprises a user profile, the user profile comprising data related to interests of the user of the specified user compute device.

5. The processor-implemented method of claim 4, further comprising:
updating the user profile with the obtained and aggregated interaction information; and
sending additional supplemental content to the endpoint based on the updated user profile.

6. The processor-implemented method of claim 1, wherein:
the monitored user interactions of the users of the plurality of user compute devices includes user-initiated sharing of base content from the multiple base content and/or supplemental content from the multiple supplement content; and
the obtaining the user interaction information includes obtaining information identifying where the base content and/or the supplemental content is shared, how the base content and/or the supplemental content is shared, or with what users the shared base content and/or the shared supplemental content is shared.

7. The processor-implemented method of claim 1, wherein the obtaining user interaction information comprises:
retrieving a number of times that at least one user of a user compute device of the plurality of user compute devices interacts with base content from the multiple base content or supplemental content from the multiple supplement content, a level of interaction of the at least one user with base content or supplemental content, whether at least one of the one or more products or services is placed into a shopping cart, or whether at least one of the one or more products or services is purchased.

8. The processor-implemented method of claim 4, wherein:
the monitored user interactions comprise eye tracking information; and
the obtaining the user interaction information comprises obtaining information on instances of eyes of a user focusing for a threshold period of time on hotspots in the base content or instances of the eyes of the user focusing for the threshold period of time on the supplemental content.

9. The processor-implemented method of claim 1, wherein:
the multiple base content comprises content viewed at multiple different angles; and
the selecting the specified supplemental content comprises selecting different supplemental content from the multiple supplement content for at least two of the multiple angles.

10. The processor-implemented method of claim 1, wherein:
the monitored user interactions comprise sharing base content or supplemental content by distributors in a downline in a multi-level-marketing organization; and
the obtaining the user interaction information comprises retrieving information associated with transactions from shared content.

11. The processor-implemented method of claim 10, further comprising:
identifying distributors in an upline for the transactions; and
logging the transactions with each of the distributors in the upline.

12. A processor-implemented method, comprising:
monitoring a plurality of user compute devices for user interactions with a plurality of base video content and associated supplemental content, the user interactions including user-initiated sharing of at least one of base video content from the plurality of base video content and supplemental content, the supplemental content associated with one or more products or services identified in a base video content and displayed within the base video content when the base video content is displayed on a user compute device from the plurality of user compute devices;

aggregating user interaction information associated with the monitored user interactions of the plurality of user compute devices, the user interaction information included user-initiated sharing information;

selecting supplemental content to provide to a given user compute device based on (i) the aggregated user interaction information and (ii) a specified base video content requested for presentation at the given user compute device;

dynamically binding the selected supplemental content and the specified base video content to form a shareable media container, the shareable media container, when instantiated, configured to render in an interface, the specified base content and the selected supplemental content, the interface including a sharing user interface and a transaction user interface, the sharing user interface configured to allow a user to share an instance of the shareable media container to another compute device such that upon being shared to another compute device embed code instantiates the specified base video content and the selected supplemental content, the transaction user interface configured to allow the user to initiate and complete an e-commerce transaction associated with at least one of the one or more products or services within the shareable media container without diverting from the specified base content, the shareable media container being configured to monitor and collect information related to the e-commerce transaction; and providing the shareable media container including the dynamically bound requested base video content and the selected supplemental content to an endpoint associated with the given user compute device for viewing by a user of the user compute device.

13. The processor-implemented method of claim 12, wherein the user-initiated sharing information includes identification of the base video content or the supplemental content, how the base video content or the the supplemental content is shared, and where the base video content or the the supplemental content is shared.

14. The processor-implemented method of claim 12, wherein the user-initiated sharing information includes identification of a recipient user compute device of shared base video content or shared supplemental content.

15. The processor-implemented method of claim 12, wherein the monitoring the plurality of user compute devices for user interactions with the plurality of base video content and associated supplemental content further comprises monitoring user eye tracking data, the user eye tracking data including information on instances of eyes of a user focusing for a threshold period of time on one or more hotspots in the base video content or instances of the eyes of the user focusing for the threshold period of time on the supplemental content.

16. The processor-implemented method of claim 12, wherein:
the plurality of base video content comprises video content viewed at multiple different angles; and
the selecting supplemental content to provide to the given user compute device further comprises selecting supplemental content for at least two of the multiple angles.

17. The processor-implemented method of claim 12, further comprising
monitoring one or more social networks for one or more trending topics; and
wherein the selecting supplemental content to provide to the given user compute device is further based on the one or more trending topics.

18. The processor-implemented method of claim 12, further comprising:
monitoring activity of the given user compute device for one or more predefined events;
responsive to the given user compute device triggering one of the predefined events, determining whether the given user compute device is associated with a hot wallet; and
responsive to the given user compute device being associated with the hot wallet, mining crypto-currency in the hot wallet for currency information related to user interactions of the user compute device.

19. The processor-implemented method of claim 18, wherein the one or more predefined events include at least one of: product interactions, loading a video player, playing a video, stopping the video, watching a pre-roll, and/or opening a product flow.

20. The processor-implemented method of claim 18, wherein the currency information includes at least one of: a number of views, a number of impressions, uniqueness information, time information, events, transactions, social interactions, geo-location information, audience data, and content data.

21. A processor-implemented method, the method comprising:
monitoring a plurality of compute devices for user interactions with a plurality of base video content and associated supplemental content, the user interactions including user-initiated sharing of at least one of base video content from the plurality of base video content and supplemental content, the supplemental content associated with one or more products or services identified in a base video content and displayed within the base video content when the base video content is displayed on a compute device from the plurality of compute devices;

aggregating user interaction information associated with the monitored user interactions of the plurality of compute devices, the user interaction information included user-initiated sharing information;

selecting supplemental content to provide to a given compute device based on (i) the aggregated user interaction information and (ii) a specified base video content requested for presentation at the given compute device;

dynamically binding the selected supplemental content and the specified base video content to form a shareable media container instantiated by embed code, the shareable media container including a share user interface and a transaction user interface, the share user interface configured to allow a user to share an instance of the shareable media container to another compute device such that upon being shared to another compute device the embed code instantiates the specified base video content and the selected supplemental content, the transaction user interface configured to allow a user to initiate and complete an e-commerce transaction associated with at least one of the one or more products or services within the shareable media container without diverting from the specified base content, the shareable media container being configured to monitor and collect information related to the e-commerce transaction; and providing the shareable media container including the dynamically bound requested specified base video content, the selected supplemental content, and embed code to an endpoint associated with the given compute device for viewing by a user of the compute device.

22. The processor-implemented method of claim 21, further comprising:

monitoring the plurality of compute device for one or more predefined events;

responsive to a given compute device triggering one of the predefined events, determining if the given compute device is associated with a crypto-currency wallet; and sending associated metadata to a blockchain if the given compute device is determined to be associated with a crypto-currency wallet.

\* \* \* \* \*